United States Patent [19]

Krueger

[11] Patent Number: 4,973,252
[45] Date of Patent: Nov. 27, 1990

[54] SONAR SIMULATION SYSTEM USING ADVANCED DIGITAL TO VIDEO CONVERSION TECHNIQUES

[75] Inventor: Thomas A. Krueger, Diamond Bar, Calif.

[73] Assignee: The United States of America as represented by the Secretary of the Navy, Washington, D.C.

[21] Appl. No.: 198,335

[22] Filed: Nov. 12, 1971

[51] Int. Cl.$^5$ .................................................. G01S 7/40
[52] U.S. Cl. ........................................................ 434/6
[58] Field of Search .......................... 35/10.4; 434/6–10

[56] References Cited

U.S. PATENT DOCUMENTS 3,341,697 9/1967 Kaufman et al. ......................... 434/7

Primary Examiner—Nelson Moskowitz
Assistant Examiner—Daniel T. Pihulic
Attorney, Agent, or Firm—Michael J. McGowan; Prithvi C. Lall

[57] ABSTRACT

A sonar simulation system comprises a general purpose digital computer and an interface processor which receives position and intensity information from the computer for the effects to be simulated and spreads the effects in range and bearing to simulate a PPI display. Simulated range-bearing cells are displayed on the PPI with a resolution of 0.5° making the time between cells 46 microseconds. During each 46 microseconds interval, all of the sonar effects are independently and successively examined to determine if they have a contribution to the next cell to be displayed. The intensity of each of the contributors are summed for output to the sonar interface equipment.

10 Claims, No Drawings

SONAR SIMULATION SYSTEM USING ADVANCED DIGITAL TO VIDEO CONVERSION TECHNIQUES

BACKGROUND OF THE INVENTION

This invention relates in general to a system for training sonar operators by means of a simulated PPI display on the screen of a CRT. In particular, the invention relates to a simulated PPI display system using digital to video techniques.

Effective operator training requires a display as realistic as possible. Realism requires that a large number of effects, such as wakes, reverberations, and target echo, be simulated. Realism also requires a system having fast signal processing time. With many of the well known analog systems of the prior art, the necessity of a manual input for each effect severely limited the number of effects which could be simulated at any one time. Also, the slow signal processing time of analog devices detracts from the realism of their displays. In another type of known simulator, simulated input information is introduced directly into the sonar transducers of an actual sonar system. This has a disadvantage in that it can be used only on a ship or other installation where real sonar systems exist. A further disadvantage is that if the sonar system is inoperative, or undergoing maintenance, the simulation system cannot be used for training. Prior art systems using digital to video techniques require large quantities of hard-wired, special purpose signal generators resulting in high initial cost, high maintenance expense and large storage space.

SUMMARY OF THE INVENTION

The present invention, by allowing a large number of effects to be displayed and providing high speed signal processing, provides a very realistic display. Since the invention does not require a real sonar system to operate, the invention can be utilized in any convenient location and does not depend on the operability of a real sonar system. The invention obviates most special purpose hardware by placing these functions inside a general purpose digital computer.

The digital to video techniques of display simulation make use of the high speed processing capabilities of third generation computers and the advantages of direct writing display systems. Fast internal execution time and fast input/output rates permit the processing of data rapidly enough to paint a PPI picture on a CRT.

The PPI is simulated by dividing the spiral sweep into a number of bearing and range increments, computing the display intensity from all acoustic sources required for each increment, and outputting the data at a rate sufficient to drive a CRT with an expanding spiral sweep having realistic intensity modulation. The simulated PPI is driven at a sweep rate of 30 rps (33 milliseconds/rev.), and each sweep is divided into increments or cells of 0.50° each, which are sufficiently small to be below the effective resolution of the CRT. The display rate per cell is 46 microseconds, and that output rate of intensity data, synchronized with the position of the sweep, produces the simulated PPI. The intensity level for each cell is computed individually as the summation of all sources of noise and signal from the range and bearing location of the cell. During each 46 microseconds interval, all of the sonar effects are independently examined to determine if they have a contribution to the intensity of the next cell to be displayed. The intensities of each of the contributors are summed for output to each cell.

OBJECTS OF THE INVENTION

An object of the present invention is to provide a sonar simulation system having a realistic display.

Another object of the invention is to provide a sonar simulation system using digital to video techniques which requires very little special purpose hardware.

Other objects advantages and novel features of the present invention will become apparent in the following detailed description of the invention when considered in conjunction with the accompanying drawings.

DESCRIPTION OF THE PREFERRED EMBODIMENT

Figure 1:
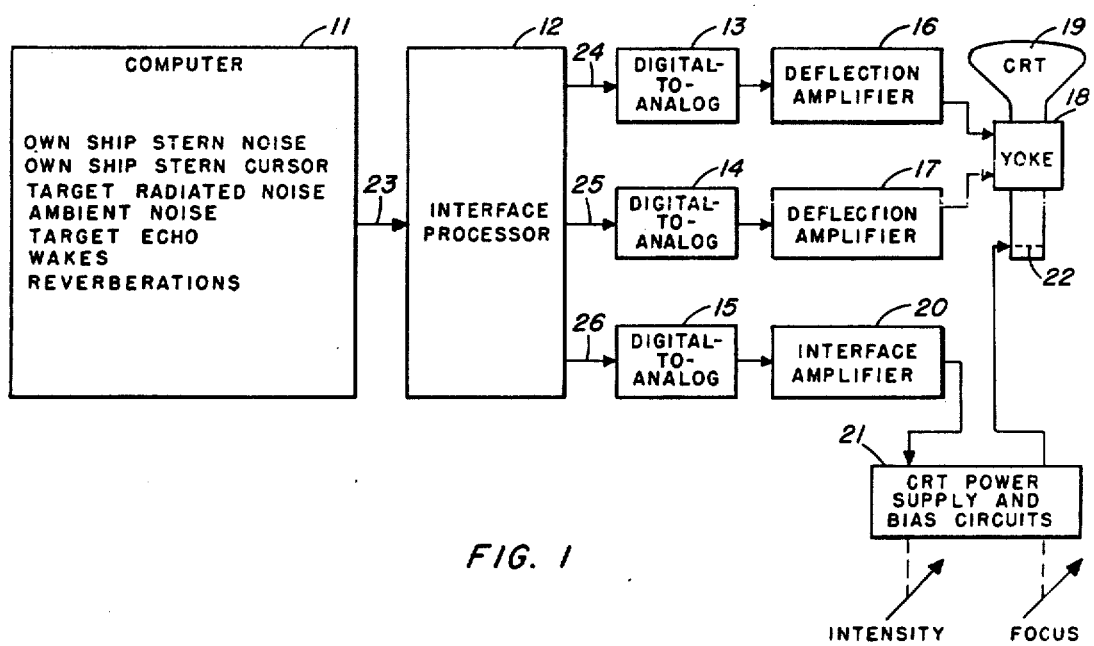
FIG. 1 shows, in block diagram form, a sonar simulation system using digital to video techniques.

Referring to FIG. 1, a general purpose digital computer 11 stores the information regarding the effects to be displayed and controls the operation of the system. Interface processor 12 processes the information received from the computer and outputs position and intensity signals in digital form. Digital-to-analog converters 13, 14 and 15 convert the signals to analog form. The position signals are passed through deflection amplifiers 16 and 17 to yoke 18 of CRT 19. The intensity signal is fed through interface amplifier 20 to the CRT power supply and bias circuits 21, which control the voltage on grid 22 of the CRT.

Figure 2:
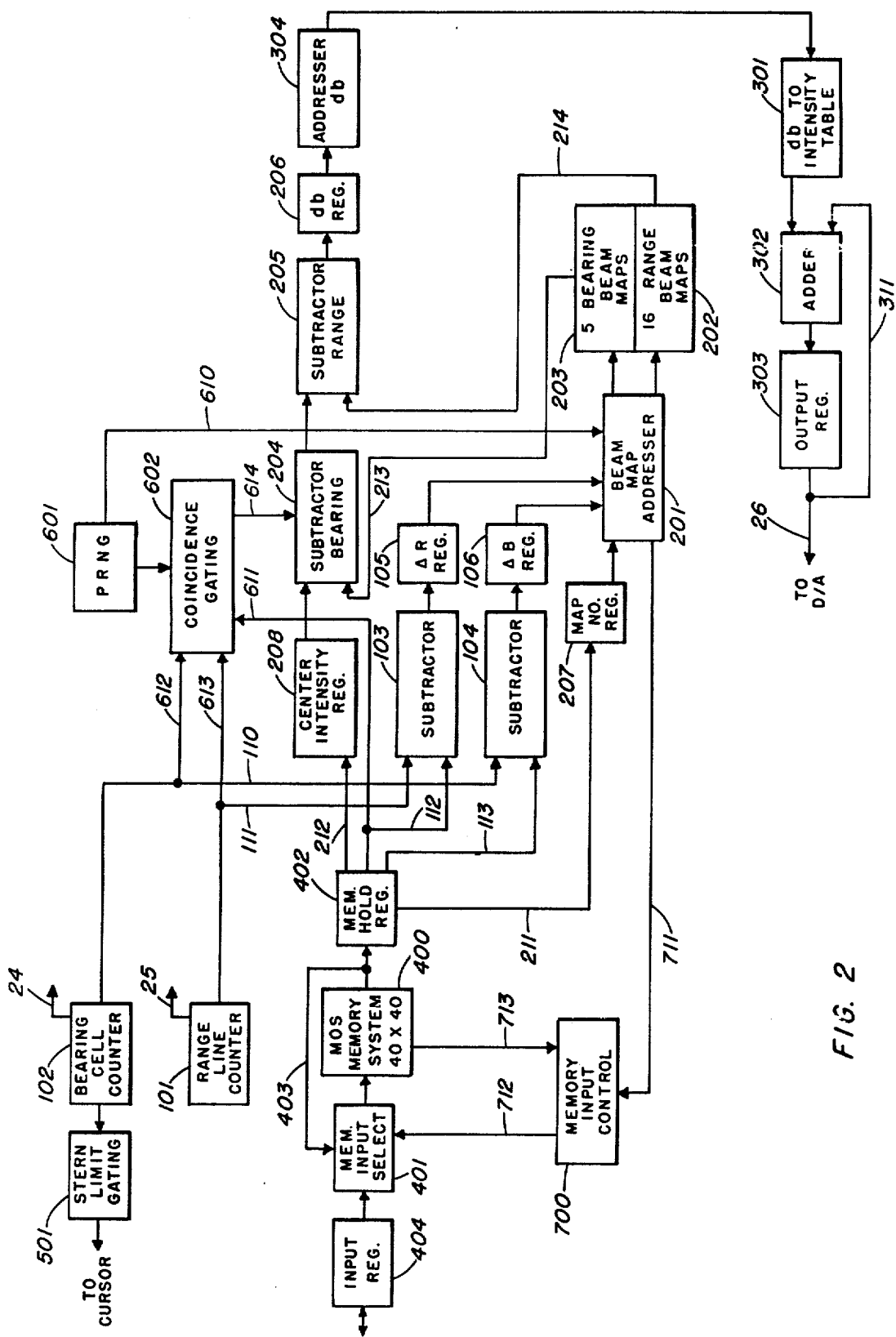
FIGS. 2 shows in detail the interface processor block 12 of FIG. 1.

Reference will now be made to FIG. 2 which shows in detail the interface processor 12 of FIG. 1. Data from the computer is loaded into an internal 40 word recirculating memory 400 through input register 404 and memory input selector 401. Each word represents the data for one sonar effect to be displayed. Thus, the processor has the capacity of displaying up to 40 effects at any given time. During each 46 microsecond cycle of operation, which is to be further described below, the recirculating memory 400 shifts sequentially into memory hold register 402 the word present in each location. The word is also shifted back into the memory along line 403 and through memory input selector 401. The words are shifted 1 microsecond apart.

The equipment is constructed as a pipeline processor with each data going through three processing stages. At any given instant in time, all processing stages are working on different data, for example, during the first microsecond, effect one is in processor stage one; during the second microsecond, effect one is in processor stage two and effect two is in processor stage one; and during the third microsecond, effect one is in processor stage three, effect two is in processor stage two, and effect three is in processor stage one. Each processing stage takes one microsecond so that the total processing time per cell is 42 microseconds.

In processing stage one, range and bearing cell deviation are computed. The target data are read from memory and the deviation between the actual target point position and the next cell to be displayed is determined and stored in an interprocessor memory register. Range line counter 101 and bearing cell counter 102 provide data as to which range-bearing cell is to be displayed. This data is applied at the start of each 46 microsecond cycle to substractors 103 and 104 via lines 110 and 111. Also at the start of each cycle, the data from the first of the 40 locations in recirculating memory 400 is placed in memory hold register 402. This data is also applied to subtractors 103 and 104 via lines 112 and 113. During the first microsecond of operation, subtractor 103 subtracts the range of the first effect from the range of the cell to be displayed and the resulting range deviation data is stored in range deviation register 105. Simultaneously, subtractor 104 provides, in like manner, bearing deviation which is stored in bearing deviation register 106. Thus, after the first microsecond, the data of the first effect has been processed by stage 1 and the results are stored in registers 105 and 106.

During the second processing stage, range and bearing deviation are used to determine the intensity of the effects at the location of the simulated range bearing cell. During the second microsecond of the cycle, the data in registers 105 and 106 are applied to beam map addressor 201. The data of the first effect is shifted into map number register 207 via line 211 and into center intensity register 208 via line 212 as the data of the second effect to be processed is shifted into memory hold register 402. The map number register need store only that part of the computer word containing map number information. Likewise, center intensity register need store only center intensity information. The information in map number register 207 is applied to beam map addresser 201 and determines which maps are to be selected. The range deviation is then applied to the range beam maps 202 and the bearing deviation is applied to bearing beam maps 203. The beam maps are read only memories which provide attenuation number in db as a function of range or bearing deviation. Each memory has a plurality of locations within it, each location storing an attenuation number. Five maps for bearing and sixteen maps for range are provided, the selection of which is determined individually for each effect. Parts of the data contained in each of the 40 words in the recirculating memory 400 is determinative of which beam maps are to be selected. It is this data which is stored in the map number register and applied to the beam map addresser. The range and bearing deviations determine which location in each selected map is to be addressed. Following memory lookup, the attenuation numbers are subtracted from a "center intensity" which is determined individually for each effect by data contained in the word representative of each effect. The "center intensity" is the intensity of the effect when the range and bearing deviations are zero. This data is stored in center intensity register 208 and applied to bearing subtractor 204. The attenuation number due to bearing deviation is also applied to subtractor 204 from beam bearing maps 203 via line 213 and is subtracted from the "center intensity". The output of subtractor 204 is applied to range subtractor 205 along with the attenuation number due to range deviation from range bearing maps 202 via line 214. The output of subtractor 205 is stored in db register 206. At this instant, two microseconds after initiation of operation, the data of the first effect has been processed by stage 2 and the results stored in register 206. Also, the second effect has been processed by stage 1 of the processor and the results of that process are stored in registers 105 and 106.

In the third processing stage, the intensity number developed in stage 2 in db is converted into a voltage proportional intensity value by table lookup in another read only memory. The converted number is added to the results of previous computations so that the intensity number output to the sonar interface represents a resultant intensity which is the sum of all the contributors to the cell to be displayed. During the third microsecond, the signal intensity in db stored in register 206 is read by memory addresser 304 into a read only memory 301 which provides db to voltage conversion. The voltage number is applied to adder 302 whose cumulative total is applied to output register 303. This cumulative total is also fed back to the adder via line 311 so that the adder can continuously add each successive voltage number to the cumulative total of the previously received voltage numbers to arrive, at the end of a cycle, at a resultant intensity for the cell to be displayed. At this instant, three microseconds after initiation of operation, the data of the first effect has been processed by all three stages and is stored in output register 303. Also, the second effect has been processed by the second stage and is stored in register 206, and the third effect has been processed by stage one and is stored in registers 105 and 106. Continuing in this manner, after 42 microseconds all the data stored in the 40 locations in the recirculating memory 400 are processed and the resultant intensity stored in the output register 303. The data in register 303 is then transferred via line 26 to digital-to-analog converter 15 shown in FIG. 1.

Figure 3:
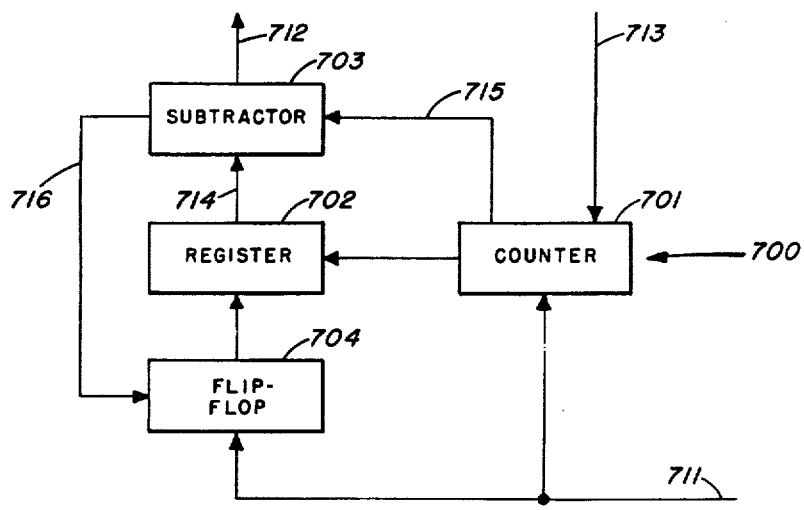
FIG. 3 shows in detail the memory input control block 700 of FIG. 2.

The processor is not limited to 40 effects for one complete sweep of the face of the CRT. Each effect, once loaded into the 40 word recirculating memory 400, remains in memory until its display is completed. Thus, for a target appearing on range ring 40 and whose "banana" display extends to ring 50, the display of the target is not complete until ring 50 has been displayed. After the display of the target is complete, the range deviation will be greater than a predetermined number of range rings at the same time that the bearing deviation is less than a predetermined number of degrees. When this occurs, beam map addresser 201 activates memory input control 700 which will cause the memory input selector 401 to declare the memory location storing the effect empty and allow the computer to write another sonar effect into this location. Memory input control 700 comprises a counter 701, a register 702, a subtractor 703 and a flip-flop 704 as shown in FIG. 3. The operation of memory input control 700 will now be described. The activating signal from the beam map addresser is applied to counter 701 and flip-flop 704 via line 711. The counter is connected by line 713 to the memory 400 and counts the memory locations as they are read into the memory hold register. When the counter receives a signal on line 711 it transfers the number of the memory location then being read into register 702. The signal also sets flip-flop 704 to inhibit register 702 from being shifted by another signal. Due to the fact that the signal occurs 2 microseconds after the memory location of interest is read, the number in the register 702 is actually 2 greater than the number of the location of interest. For this reason, the number in the register is applied to subtractor 703 via line 714 while the number in the counter is applied to the subtractor via line 715. The subtractor is set to supply a signal to line 712 and 716 when the number in the register minus the number in the counter is equal to 2. Therefore, on the next 46 microseconds cycle of operation of the processor, the subtractor will supply a signal to the memory input selector via line 712 when the memory location of interest is being read. The memory input selector will then cause another effect to be entered into the location from input register 404. The signal from the subtractor on line 716 also resets flip-flop 704 so that the circuit is ready to operate when another effect has completed its display.

Stern limit gating 501 receives the cell bearing information from bearing cell counter 102 and energizes an electronic cursor on alternate cell bearing readings of 180°.

As far as the processor is concerned, targets, reverberations, wake data, etc., are identical in terms of processing and differ only in the range and bearing beam maps used to spread them for display. Stern noise is handled by the same processing steps except that the range deviation is artifically obtained from a pseudo random number generator 601. This artificial range deviation information is applied to beam map addresser 201 via line 610 during the time that the stern noise effect is being processed. Therefore, the stern noise occurs at all range lines with the edges randomly feathered by the artificial range attenuation. For ambient noise, the computer specifies the intensity of the noise and the density. During the processing of this effect for each cell, the computer supplies via line 611 a probability of occurrence according to the density desired and this is used to sum the noise quantity into certain cells while omitting it from others. Coincidence gating 602 compares selected bits received via line 612 from the bearing cell counter 102, received via line 613 from the range line counter 101 and received from the Psudo Random Number Generator (PRNG) 601. Bits from these sources are selected such that their coincidence is for all intents and purposes a random occurrence. Probability information received via line 611 determines how many of these selected bit pairs must collectively coincide for noise to be added to the intensity of that cell. For example, if the probability specified by line 611 is 50%, then only one pair of bits is examined for coincidence. This will occur statistically one-half of the time and result in an ambient noise marking density of 50%. If 25% is specified, two pairs of bits must individually and collectively coincide. This happens approximately 25% of the time. When coincidence occurs, coincidence gating 602 will open and pass the ambient noise from generator 601 to subtractor 204 via line 614. Thus, randomness is achieved in the placement and intensity of ambient noise.

Obviously many modifications and variations of the present invention are possible in light of the above teachings. It is therefore to be understood that, within the scope of the appended claims, the invention may be practiced otherwise then as specifically described.

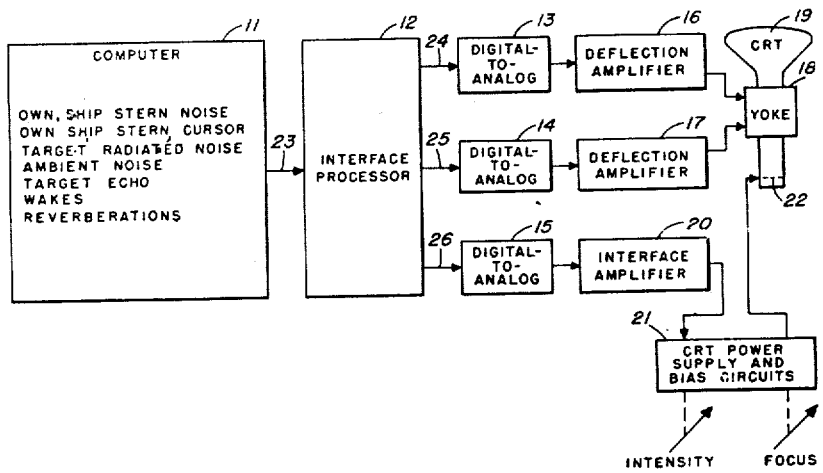

What is claimed is:

1. A system for visual display of simulated sonar effects comprising:
   means for visually displaying sonar effects;
   digital-to-analog convertor means connected to said display means;
   digital computer means for storing said sonar effects and for controlling said system; and
   processing means, connected between said computer means and said convertor means, for examining, during a predetermined period of time, each effect successively and independently to determine the intensity of each effect, for summing the intensities thus determined to arrive at a resultant intensity, and for applying, at the end of said predetermined period of time, a signal representative of the resultant intensity to said convertor means.

2. The system of claim 1 wherein said processing means includes;
   means for indicating the location of the area of said display means which is to be swept during said predetermined period of time;
   means for indicating individually the locations of the areas of said display means where said effects are to be displayed; and
   means for comparing the first mentioned location with each of said second mentioned locations and calculating the deviations of said second mentioned locations from said first mentioned location.

3. The system of claim 2 wherein said processing means further includes:
   a plurality of read-only memories for storing attenuation numbers, each memory having a plurality of locations within it;
   memory addressing means responsive to each effect for selectively addressing certain ones of said memories and responsive to said deviations for selectively addressing locations within said certain ones of said memories, thereby activating the desired attenuation numbers; and
   means for subtracting the attenuation numbers from a center intensity provided by the computer for each effect, thereby calculating the intensity of each effect.

4. The system of claim 3 wherein the attenuation numbers and center intensities are in decibel units, said processing means including;
   a further read-only memory for storing intensity numbers in volt units; and
   a further memory addressing means responsive to the intensity of each effect in decibel units for selectively addressing said further memory to provide decibel to volt conversion.

5. The system of claim 3 wherein said processing means further includes:
   a recirculating memory for storing all the effects to be processed in any one of said predetermined periods of time;
   memory input control means responsive to the completion of the display of an effect for providing a signal indicative of said completion; and
   input selecting means connected to said recirculating memory and said memory input control means for declaring, after the display of an effect is complete, that the memory location storing the effect is empty and for allowing said computer to write another effect into this location.

6. The system of claim 5 wherein said memory input control means comprises:
   a counter connected to said recirculating memory and to said memory addressing means for counting memory locations;
   a subtractor connected to said counter and to said input selecting means;
   a register connected to said subtractor and said counter; and
   a flip-flop connected to said subtractor, to said register and to said memory addressing means.

7. The system of claim 3 wherein said processing means further includes:

means responsive to stern noise effect for providing artificial random deviation to said memory addressor when stern noise effect is being examined.

8. The system of claim 3 wherein said processor further includes:
means for providing ambient noise intensity; and
gating means, controlled by said computer means, connected between said ambient noise intensity providing means and said subtracting means, for selectively passing said ambient noise intensity during some of said predetermined periods of time.

9. The system of claim 1 wherein said processor further includes means for periodically energizing an electronic cursor on said display means.

10. The system of claim 1 wherein said processing means further includes:
a recirculating memory for storing all the effects to be processed in any one of said predetermined periods of time; and
means for replacing, in said memory, an effect whose display has been completed by another effect from said computer.

* * * * *

UNITED STATES PATENT AND TRADEMARK OFFICE
CERTIFICATE OF CORRECTION

PATENT NO. : 4,973,252

DATED : November 27, 1990

INVENTOR(S) : Thomas A. Krueger

It is certified that error appears in the above-identified patent and that said Letters Patent is hereby corrected as shown below:

The title page should be deleted and substitute therefor the attached title page.

The sheets of drawings consisting of figures 1, 2 and 3, should be added as shown on the attached pages.

Signed and Sealed this

First Day of September, 1992

Attest:

DOUGLAS B. COMER

Attesting Officer

Acting Commissioner of Patents and Trademarks

United States Patent [19]

Krueger

[11] Patent Number: 4,973,252

[45] Date of Patent: Nov. 27, 1990

[54] SONAR SIMULATION SYSTEM USING ADVANCED DIGITAL TO VIDEO CONVERSION TECHNIQUES

[75] Inventor: Thomas A. Krueger, Diamond Bar, Calif.

[73] Assignee: The United States of America as represented by the Secretary of the Navy, Washington, D.C.

[21] Appl. No.: 198,335

[22] Filed: Nov. 12, 1971

[51] Int. Cl.$^5$ .................................................. G01S 7/40
[52] U.S. Cl. ......................................................... 434/6
[58] Field of Search ......................... 35/10.4; 434/6–10

[56] References Cited

U.S. PATENT DOCUMENTS 3,341,697  9/1967  Kaufman et al. ......................... 434/7

Primary Examiner—Nelson Moskowitz
Assistant Examiner—Daniel T. Pihulic
Attorney, Agent, or Firm—Michael J. McGowan; Prithvi C. Lall

[57] ABSTRACT

A sonar simulation system comprises a general purpose digital computer and an interface processor which receives position and intensity information from the computer for the effects to be simulated and spreads the effects in range and bearing to simulate a PPI display. Simulated range-bearing cells are displayed on the PPI with a resolution of 0.5° making the time between cells 46 microseconds. During each 46 microseconds interval, all of the sonar effects are independently and successively examined to determine if they have a contribution to the next cell to be displayed. The intensity of each of the contributors are summed for output to the sonar interface equipment.

10 Claims, 2 Drawings Sheets